United States Patent [19]
Griffin, III et al.

[11] Patent Number: 5,249,294
[45] Date of Patent: Sep. 28, 1993

[54] DETERMINATION OF TIME OF EXECUTION OF PREDETERMINED DATA PROCESSING ROUTINE IN RELATION TO OCCURRENCE OF PRIOR EXTERNALLY OBSERVABLE EVENT

[75] Inventors: Roy A. Griffin, III, Oceanside; James N. Esserman, San Diego; Steven E. Anderson, La Jolla; Steven R. Hart, Encinitas; Ron D. Katznelson, San Diego, all of Calif.

[73] Assignee: General Instrument Corporation, Chicago, Ill.

[21] Appl. No.: 13,246

[22] Filed: Feb. 3, 1993

Related U.S. Application Data

[63] Continuation of Ser. No. 497,012, Mar. 20, 1990, abandoned.

[51] Int. Cl.$^5$ ............................................... G06F 9/40
[52] U.S. Cl. ............................ 395/650; 364/DIG. 1; 364/261.8; 364/271.5; 364/264.2
[58] Field of Search ................. 364/DIG. 1, DIG. 2; 595/650, 725

[56] References Cited

U.S. PATENT DOCUMENTS

| | | | |
|---|---|---|---|
| 4,494,114 | 1/1985 | Kaish | 364/DIG. 2 |
| 4,583,196 | 4/1986 | Koo | 364/900 |
| 4,879,645 | 11/1989 | Tamada et al. | 364/DIG. 1 |

FOREIGN PATENT DOCUMENTS

| | | |
|---|---|---|
| 0145405 | 6/1985 | European Pat. Off. |
| 0157303 | 1/1988 | European Pat. Off. |

*Primary Examiner*—Thomas M. Heckler
*Attorney, Agent, or Firm*—Edward W. Callan

[57] ABSTRACT

Compromise of a predetermined secure data processing routine by a procedure known as a "clock attack" is prevented by a method that inhibits synchronization with externally generated instructions by preventing determination of the time of execution predetermined data processing routine in relation to occurrence of an externally observable event that precedes the execution of the predetermined routine. The method includes the step of (a) randomly varying the duration between the occurrence of the externally observable event and the execution of the predetermined routine. Step (a) includes the steps of (b) executing one or more interim data processing routines between the occurrence of the externally observable event and the execution of the predetermined routine; and (c) randomly varying the duration of said interim routines. Steps (b) and (c) may include the step of (d) randomly assembling m said interim routines for said execution from a group of n stored routines having different durations, wherein m and n are integers, with n being greater than m. Step (d) may include either the step of (e) randomly accessing said m interim routines from a secure memory; or the steps of (f) randomly accessing pointers for said m interim routines from a secure memory; and (g) accessing said m interim routines from a memory in response to said pointers. Step (c) includes the step of (h) randomly varying the duration of the interim routines in response to dynamically processed data that does not repetitively recur each time said interim routines are accessed. The method further includes the steps of (i) monitoring said interim routines to detect whether said interim routines are being tampered with; and (j) preventing the execution of said predetermined routine in response to detecting that said interim routines are being tampered with.

34 Claims, 4 Drawing Sheets

DETERMINATION OF TIME OF EXECUTION OF PREDETERMINED DATA PROCESSING ROUTING IN RELATION TO OCCURRENCE OF PRIOR EXTERNALLY OBSERVABLE EVENT

This is a continuation of co-pending application Ser. No. 07/497,012 filed on Mar. 20, 1990, abandoned.

BACKGROUND OF THE INVENTION

The present invention generally pertains to data processing and is particularly directed to preventing compromise of secure data processing routines by a procedure known as a "clock attack".

A clock attack is a procedure by which an attacker gains access to secure data or code used in a predetermined data processing routine being executed within a secure data processor, such as a secure microprocessor, by determining the time of execution, of the predetermined data processing routine in relation to occurrence of an externally observable event that precedes the predetermined routine in order to enable synchronization with an internally generated instruction for the predetermined routine, and then externally changing the clock cycle for one cycle of the instruction in order to create a very short clock cycle that alters the instruction in a repeatable way that makes the secure data and/or code externally accessible.

An "externally observable event" is defined as any internal state transition that manifests itself externally, including but not limited to a change in voltage or current at any pin or combination of pins which is related to or affected by internal processor execution.

SUMMARY OF THE INVENTION

The present invention prevents such clock attacks by providing a method that inhibits synchronization with externally generated instructions by preventing determination of the time of execution of a predetermined data processing routine in relation to occurrence of an externally observable event that precedes execution of the predetermined routine, wherein said externally observable event is related to or affected by execution of the overall larger routine.

The method of the present invention includes the step of (a) randomly varying the duration between the occurrence of the externally observable event and the execution of the predetermined routine.

"Duration" is determined by the number of data processing clock cycles.

The term "random" is defined as including pseudo-random as well as truly random.

In one aspect of the present invention, step (a) includes the steps of (b) executing one or more interim data processing routines between the occurrence of the observable external event and the execution of the predetermined routine; and (c) randomly varying the duration of said interim routines. In this aspect of the invention, steps (b) and (c) preferably include the step of (d) randomly assembling m said interim routines for said execution from a group of n stored routines having different durations, wherein m and n are integers, with n being greater than m. It is also preferred that step (d) either includes the step of (e) randomly accessing said m interim routines from a secure memory; or the steps of (f) randomly accessing pointers for said m interim routines from a secure memory; and (g) accessing said m interim routines from a memory in response to said pointers.

In a further aspect of the present invention, step (a) includes the steps of (b) executing one or more interim data processing routines between an occurrence of the externally observable event and the execution of the predetermined routine, wherein said interim routines includes a data processing routine that is essential to the execution of said overall larger data processing routine; and (c) randomly varying the duration of said interim routines.

In another aspect of the present invention, step (a) includes the step of (b) randomly varying said duration in response to dynamically processed data that does not repetitively recur at the same time in relation to each occurrence of said externally observable event.

In yet another aspect of the present invention, step (a) includes the step of (b) randomly varying said duration in response to a combination of dynamically processed data that does not repetitively recur at the same time in relation to each occurrence of said externally observable event, and data stored in a secure memory.

In still another aspect of the present invention, step (a) includes the steps of (b) executing one or more interim data processing routines between the occurrence of the externally observable event and the execution of the predetermined routine; and (c) randomly varying the duration of said interim routines.

In all of the aspects of the present invention, the method preferably further includes the steps of (d) monitoring said interim routines to detect whether said interim routines are being tampered with; and (e) preventing the execution of said predetermined routine in response to detecting that said interim routines are being tampered with.

The present invention further provides a data processing system, comprising means for executing a macro data processing routine including a smaller predetermined data processing routine, wherein an externally observable event related to or affected by execution of the macro routine precedes execution of said predetermined routine; and means for preventing the time of execution of the predetermined data processing routine from being determined in relation to an occurrence of said externally observable event by randomly varying the duration between the occurrence of the externally observable event and the execution of the predetermined routine.

Additional features of the present invention are described in relation to the description of the preferred embodiments.

DESCRIPTION OF THE PREFERRED EMBODIMENTS

The preferred embodiments of the present invention are implemented in a secure microprocessor having a secure memory, a nonsecure memory and a secure central processing unit (CPU). Both memories may include both a random access memory (RAM) and a read only memory (ROM). The term "secure" indicates external inaccessibility.

Figure 1:
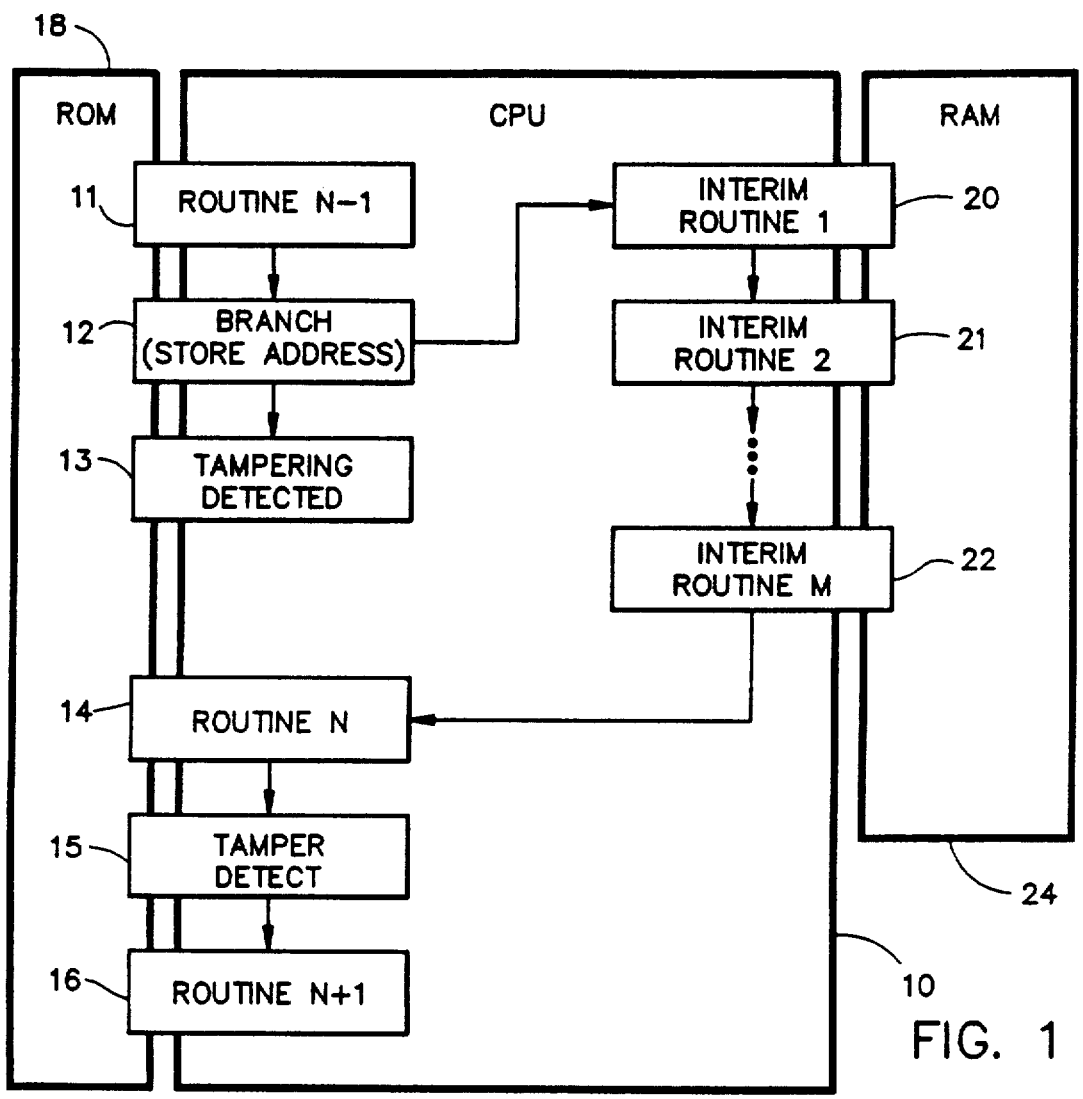
FIG. 1 is a diagram of one preferred embodiment of the the data processing method and system of the present invention.

Referring to FIG. 1, in one preferred embodiment of the present invention, a CPU 10 executes a group of data processing routines ROUTINE N−1, BRANCH, ROUTINE N, TAMPER DETECT AND ROUTINE N+1 (respectively identified by reference numerals 11, 12, 14, 15, 16) in response to instructions (code) accessed from a ROM 18; and further executes a maze of interim routines INTERIM ROUTINE 1, INTERIM ROUTINE 2, ..., INTERIM ROUTINE m (respectively identified by reference numerals 20, 21, 22) assembled in response to instructions accessed from a secure RAM 24.

The routines ROUTINE N−1, ROUTINE N, ROUTINE N+1 are essential sequential subroutines of a repetitive overall larger data processing routine, and follow the occurrence of an externally observable event during each sequence of the overall larger routine. In order to prevent a predetermined protected routine ROUTINE N from being synchronized with the externally observable event that repetitively precedes the protected routine ROUTINE N, the BRANCH routine 12 causes the CPU 10 to branch to the maze of m interim routines INTERIM ROUTINE 1, INTERIM ROUTINE 2, ..., INTERIM ROUTINE m. The total duration of the m interim routines is a random variable. The m interim routines have different durations.

To ensure that the branch into the maze of interim routines is taken, some subroutine critical to the overall larger routine is buried inside the maze. If this subroutine is not performed, then the executed overall larger routine is not valuable. The critical subroutine is buried by breaking up the instructions in such a way that the instruction for the predetermined protected routine ROUTINE N does not reside sequentially after its preceding instruction. Instead, the BRANCH routine 12 saves the address of the instruction for the predetermined protected routine ROUTINE N in a secure memory location that cannot be accessed until after execution of the maze of interim routines 20, 21, 22 is completed. After the address of the instruction for the predetermined protected routine ROUTINE N is stored, the CPU 10 executes the first interim routine INTERIM ROUTINE 1.

In the sequence of instructions stored in the ROM 18, the next instruction after the instruction for the BRANCH routine 12 is a TAMPERING DETECTED routine 13. In normal operation, the TAMPERING DETECTED routine 13 will never be executed since the CPU 10 will always branch to the maze of interim routines. However, if an attacker attempts to bypass the BRANCH routine 12, the TAMPERING DETECTED routine 13 will be executed to thereby detect the attacker's tampering attempt.

Figure 2:
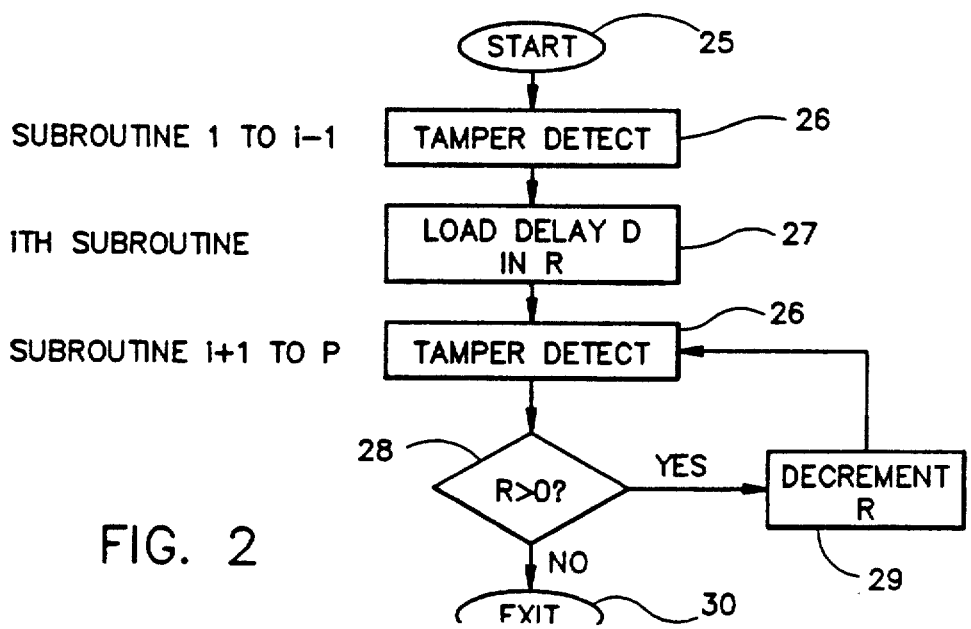
FIG. 2 is a flow diagram of a preferred embodiment of an interim routine implemented in the method and system of FIG. 1.

The purpose of executing the interim routines is to provide a delay of a variable duration between ROUTINE N−1 and ROUTINE N. Each interim routine is a loop counter routine as shown in FIG. 2, wherein the routine is completed once a number of clock cycles are counted. Referring to FIG. 2, the loop counter routine includes subroutines 25, 26, 27, 28, 29 and 30. After a START subroutine 25, the number of clock cycles D to be counted is loaded into a register implemented by the CPU 10 during a LOAD DELAY D IN R subroutine 27.

The number of clock cycles D is a random number accessed from the secure RAM 24. The random clock-cycle numbers are provided in the different portions of the secure RAM 24 from which the instructions for the different interim routines are accessed. The random clock-cycle numbers may be provided in the RAM 24 in response to a signal produced by a physically (truly) random phenomena, such as a noisy diode, or in response to a pseudorandom device, such as a pseudorandom number generator.

The R>0? subroutine 28 determines whether the value in the register is greater than zero. If YES, the value in the register is decremented by one count in accordance with a DECREMENT R subroutine 29 until the value in the register equals zero; whereupon an EXIT subroutine 30 is executed.

The LOAD DELAY D IN R subroutine 27 is executed at different times in the different interim routines so that an attacker cannot alter the instruction to be executed during the same clock cycle in each interim routine so as to establish a known delay for each interim routine after having determined that the LOAD DELAY D IN R subroutine 27 is executed at a given time of one of the interim routines.

During each interim routine, the LOAD DELAY D IN R subroutine 27 is the ith subroutine. The TAMPER DETECT subroutine 26 is repeated a number of times prior to the LOAD DELAY D IN R subroutine 27 for the respective interim routine. The TAMPER DETECT subroutine 26 is also repeated a number of times following the LOAD DELAY D IN R subroutine 27 until a predetermined number P of subroutines have been executed.

Each TAMPER DETECT subroutine 26 is a predetermined trap for monitoring the interim routines to detect whether the interim routines are being tampered with; and prevents the execution of the protected routine ROUTINE N in response to detecting that the interim routines are being tampered with.

Figure 3:
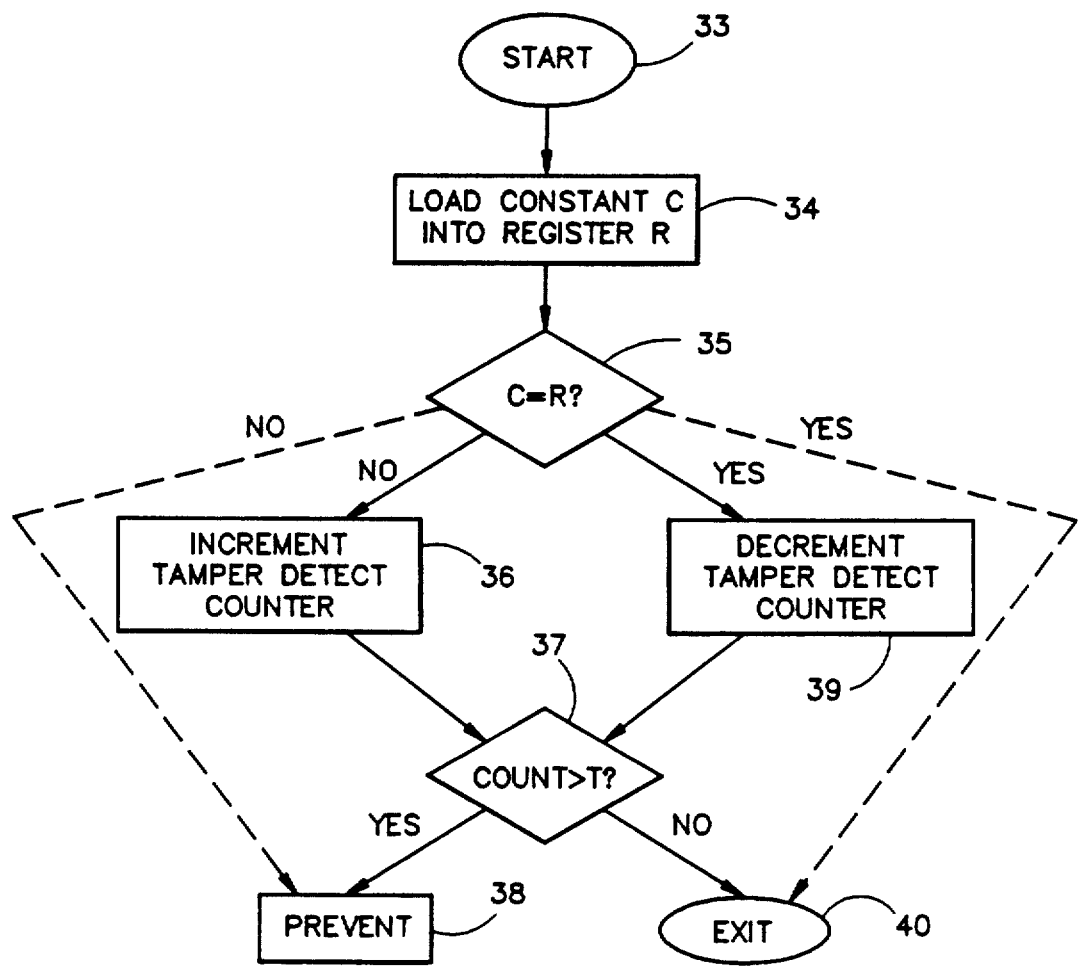
FIG. 3 is a flow diagram of a TAMPER DETECT routine implemented in the interim routine of FIG. 2.

Tampering is detected by detecting the alteration of instructions during these predetermined traps. Referring to FIG. 3, the TAMPER DETECT subroutine 26 includes subroutines (respectively identified by reference numerals 33, 34, 35, 36, 37, 38, 39 and 40) START, LOAD CONSTANT C INTO REGISTER R, C=R?, INCREMENT TAMPER DETECT COUNTER, COUNT>T?, PREVENT, DECREMENT TAMPER DETECT COUNTER, AND EXIT.

After a START subroutine 33, a constant C is loaded into a register implemented by the CPU 10 during a LOAD CONSTANT C INTO REGISTER R subroutine 34.

The C=R? subroutine 35 indicates whether or not there has been tampering in the nature of an attacker attempting to alter an instruction to be executed during that interim routine. The nature of the attacker's attempt is to alter the instruction that loads the duration-of-delay instruction for that interim routine, so as to establish a known delay for that interim routine. However, unless an attacker is able to correctly guess where the duration of delay instruction is located in the sequence of subroutines of the interim routine that is being executed, the attacker's attempted alteration of the instruction loading the delay for that interim routine will instead result in some value other than the constant C being entered into the register during the TAMPER DETECT subroutine 26 that is being executed when such alteration attempt occurs, whereupon the value R in the register does not equal the constant C during the C=R? subroutine 35. Thus, when C does not equal R, tampering is detected and a tamper detect counter implemented by the CPU 10 is incremented during an INCREMENT TAMPER DETECT COUNTER subroutine 36.

The count in the tamper detect counter is compared with a threshold value T during a COUNT >T? subroutine 37. Once this threshold value T is exceeded a PREVENT subroutine 38 is executed to prevent the execution of the predetermined protected routine ROUTINE N.

The PREVENT subroutine 38 can be implemented in several different ways. For example, secret information could be erased, or the maze of interim routines could be changed so that it is impossible to exit. In any implementation, the CPU 10 operation enters into an infinite loop so that no information can be obtained by an attacker as to the identity of the clock cycle when the tampering occurred.

So that spurious tampering or spurious signals won't cause entry into the PREVENT routine 38, a DECREMENT TAMPER DETECT COUNTER subroutine 39 decrements the tamper detect counter for each TAMPER DETECT subroutine 26 in which there is no indication of tampering, in that C does equal R. The count by which the tamper detect counter is decremented during the DECREMENT TAMPER DETECT COUNTER subroutine 39 is less than or equal to the count by which the tamper detect counter is incremented during the INCREMENT TAMPER DETECT COUNTER subroutine 36.

For each TAMPER DETECT subroutine 26 in which the value C in the tamper detect counter does equal R during the COUNT >T? subroutine 37, the TAMPER DETECT subroutine 26 concludes with an EXIT subroutine 40.

In alternative embodiment, the tamper detect counter is not utilized; and the PREVENT subroutine 38 is entered into whenever tampering is indicated by the value R in the register not equaling the constant C during the C=R? subroutine 35, as shown by a dashed line in FIG. 3. In this alternative embodiment, the EXIT subroutine 40 is entered into whenever no tampering is indicated by the value R in the register equaling the constant C during the C=R? subroutine 35, as shown by another dashed line in FIG. 3.

The interim routines should have instructions with parallel clock cycles. Most microprocessors finish execution of the current instruction when a reset interrupt occurs. If the instruction for the LOAD DELAY D IN R subroutine 27 that indicates the amount of delay in an interim routine and the instruction for the TAMPER DETECT subroutine 26 don't have exactly the same cycle lengths, then the LOAD DELAY D IN R subroutine 27 can be distinguished from the TAMPER DETECT subroutine 26 by providing a series of reset interrupts and observations of when each reset interrupt is processed. Accordingly the instructions for the LOAD DELAY D IN R subroutine 27 are of the same duration as the instructions for the TAMPER DETECT subroutine 26.

Upon completing execution of the maze of interim routines, the CPU 10 executes the protected routine ROUTINE N after accessing the address of the instruction of the protected routine ROUTINE N, which was saved by the CPU 10 when the CPU executed the BRANCH routine 12.

A TAMPER DETECT routine 15 is executed following the execution of the predetermined protected routine ROUTINE N in order to prevent an attacker from accessing the predetermined protected routine ROUTINE N by the technique of attempting to access the predetermined protected routine ROUTINE N at a time beginning after occurrence of the externally observable event of sufficient duration to encompass the maximum possible total duration of all of the interim routines and the duration of the predetermined protected routine ROUTINE N, and then upon each successive cycle of the overall data processing routine making such attempt one clock cycle earlier until the predetermined protected routine ROUTINE N is accessed. Such an attack would result in the detection of tampering by the TAMPER DETECT routine 15 and the execution of a PREVENT routine before such address could be accessed.

After executing the TAMPER DETECT routine 15, the CPU executes the ROUTINE N+1.

Figure 4:
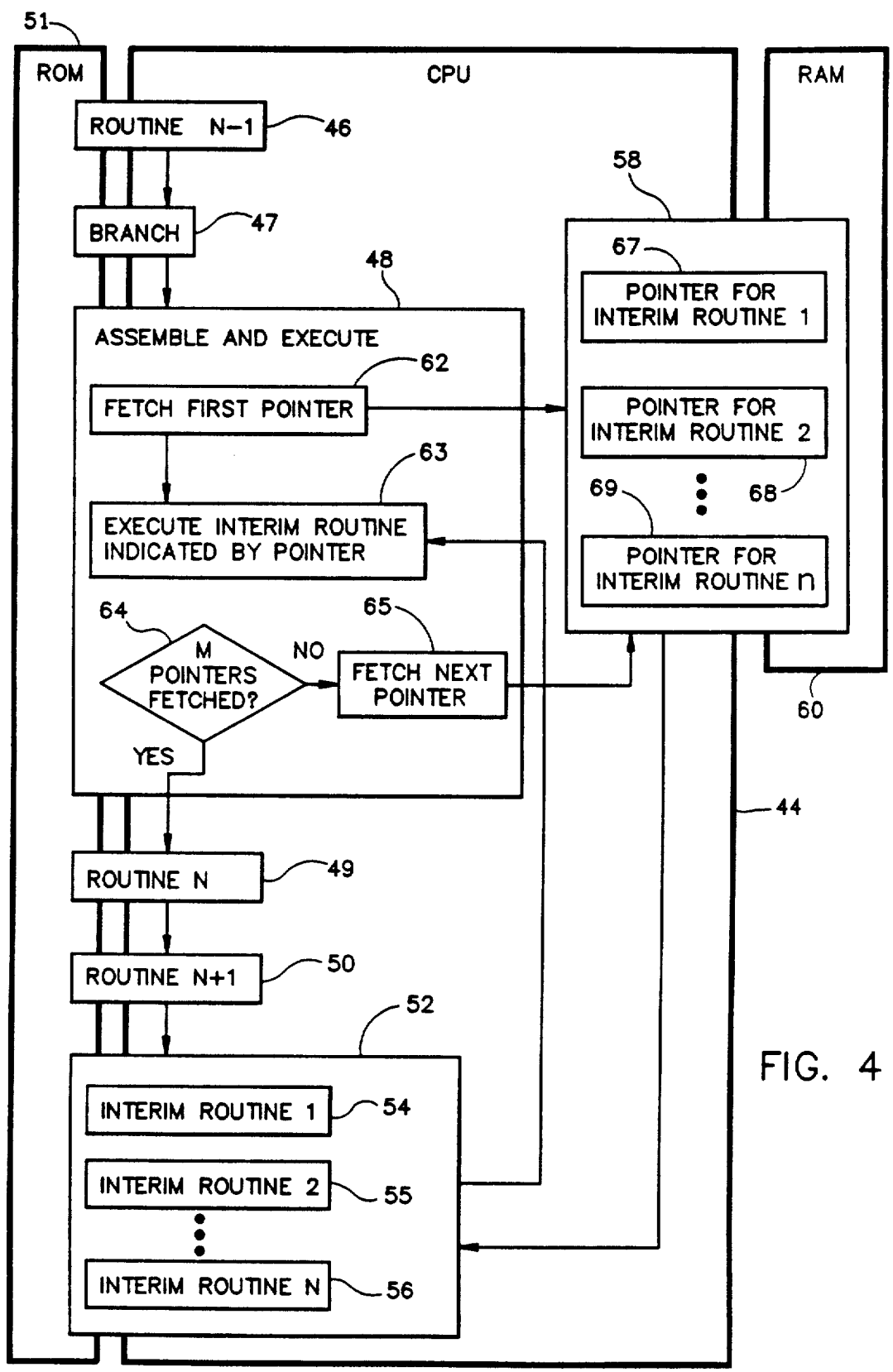
FIG. 4 is a diagram of another preferred embodiment of the the data processing method and system of the present invention.

Referring to FIG. 4, in an alternative preferred embodiment of the present invention that requires less secure RAM capacity than the preferred embodiment of FIG. 1, a CPU 44 executes a group of data processing routines ROUTINE N−1, BRANCH, ASSEMBLE AND EXECUTE INTERIM ROUTINES, ROUTINE N AND ROUTINE N+1 (respectively identified by reference numerals 46, 47, 48, 49, 50) in response to instructions (code) accessed from a ROM 51. The routines ROUTINE N−1, ROUTINE N, ROUTINE N+1 are essential sequential subroutines of a repetitive overall larger data processing routine, and follow the occurrence of an externally observable event during each sequence of the overall larger routine. In order to prevent the routine ROUTINE N from being synchronized with the externally event that repetitively precedes the routine ROUTINE N, the BRANCH routine causes the CPU 44 to branch to a maze of m interim routines assembled from a group of n interim routines INTERIM ROUTINE 1, INTERIM ROUTINE 2, ... , INTERIM ROUTINE n (respectively identified by reference numerals 54, 55, 56) stored in the ROM 51. The m interim routines are assembled from the group of n interim routines in response to pointers 58 accessed from a secure RAM 60. m and n are integers, with n being greater than m. There are $n^m$ possible mazes of interim routines. The n interim routines have different durations; and the selection and sequence of the m interim routines that are assembled for execution during a given data processing sequence is randomly varied from one sequence to the next in order to make the total duration of the interim routines a random variable. The values of the different durations of the interim routines are so distributed that a large number of the $n^m$ possible mazes of interim routines have a different total duration.

Following execution of the routine ROUTINE N−1, the BRANCH routine 47 causes the CPU 44 to branch to the ASSEMBLE AND EXECUTE INTERIM ROUTINES routine 48. The ASSEMBLE AND EXECUTE INTERIM ROUTINES routine 48 includes subroutines FETCH FIRST POINTER, EXECUTE INTERIM ROUTINE IDENTIFIED BY POINTER, M POINTERS FETCHED? and FETCH NEXT POINTER (identified respectively by reference numerals 62, 63, 64, 65).

The pointers include a POINTER FOR INTERIM ROUTINE 1, a POINTER FOR INTERIM ROUTINE 2, ..., and a POINTER FOR INTERIM ROUTINE m (identified respectively by reference numerals 67, 68, 69). The pointers 67, 68, 69 are fixed but the selection and sequence of the m pointers that are accessed during a given data processing sequence is randomly varied from one overall data processing cycle to the next in order to make the total duration of the interim routines a random variable. The selection and sequence of the m pointers is provided during each overall data processing cycle in response to a signal produced by a physically (truly) random phenomena, such as a noisy diode, or in response to a pseudorandom device, such as a pseudorandom number generator.

During the FETCH FIRST POINTER routine 62, the CPU 44 fetches the POINTER FOR INTERIM ROUTINE 1 from the RAM 60 and uses such pointer to access the instruction for INTERIM ROUTINE 1 from the ROM 51.

During the EXECUTE INTERIM ROUTINE INDICATED BY POINTER routine 63, the CPU 44 executes the routine 52 accessed from the ROM 51 in response to the pointer 58.

Following each execution of the EXECUTE INTERIM ROUTINE INDICATED BY POINTER routine 63, the CPU 44 executes the m POINTERS FETCHED? routine 64. If m pointers have not yet been fetched from the RAM 60, the CPU 44 executes the FETCH NEXT POINTER routine 65 to fetch another pointer 58 from the RAM 60 and executes the EXECUTE INTERIM ROUTINE INDICATED BY POINTER routine 63 using the interim routine 52 indicated by the newly fetched pointer 58.

Once the m POINTERS FETCHED? routine 64 indicates that m pointers 58 have been fetched from the RAM 60, the CPU 44 executes the predetermined protected routine ROUTINE N.

Each interim routine 52 is a loop counter routine as described above in relation to FIG. 2.

The preferred embodiment of FIG. 4 may also include TAMPER DETECT routines such as the TAMPER DETECT routines 15 and 26 described above with reference to FIGS. 1, 2 and 3 as well as a TAMPERING DETECTED routine such as the TAMPERING DETECTED routine 13 described above with reference to FIGS. 1.

Figure 5:
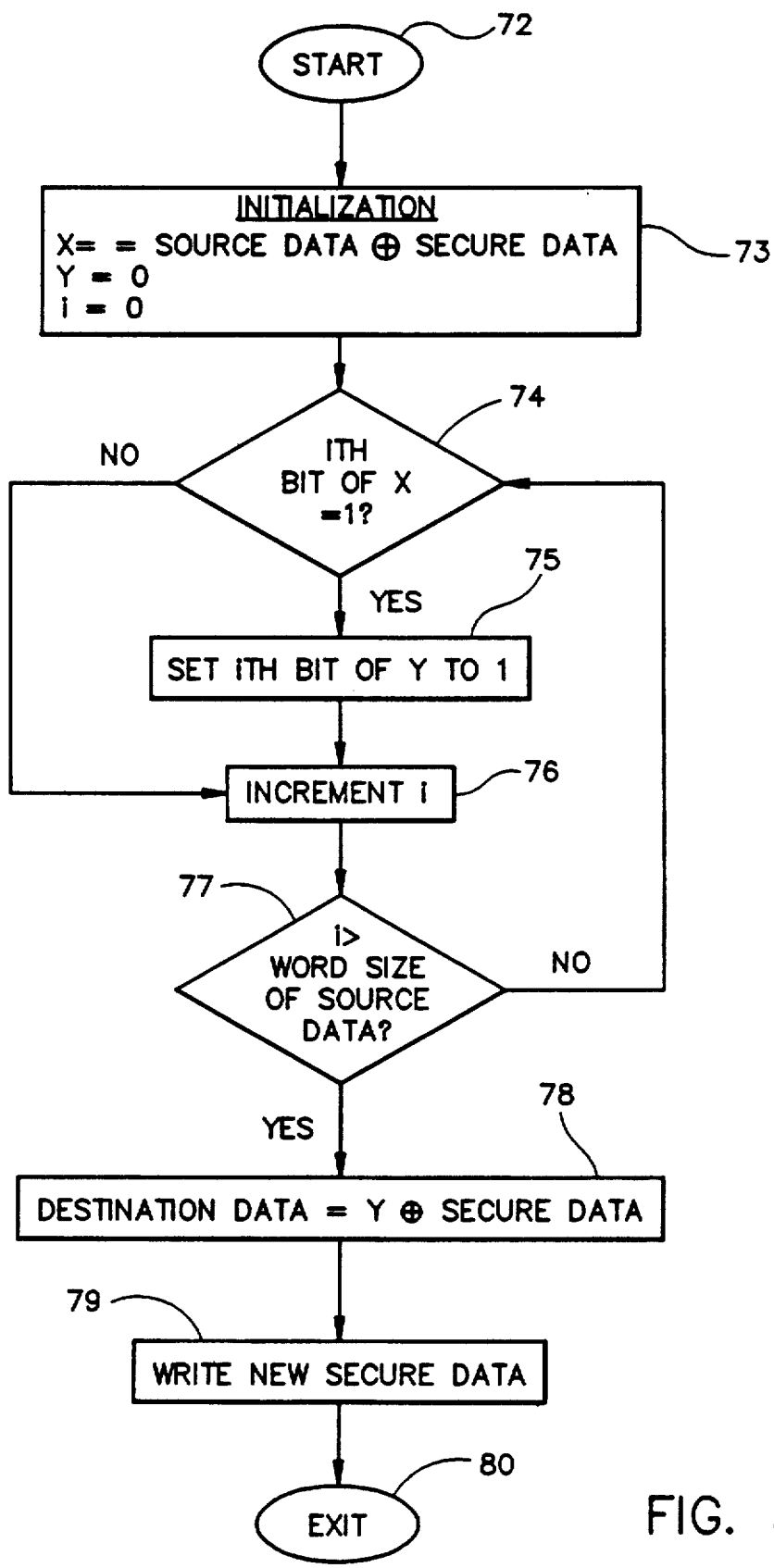
FIG. 5 is a flow diagram of an alternative preferred embodiment of an interim routine.

FIG. 5 illustrates an alternative preferred, embodiment of an interim routine. In this interim routine the duration between the externally observable event and the predetermined protected routine is randomly varied in response to both dynamically processed data that does not repetitively recur at the same time in relation to each occurrence of the externally observable event, and data stored in a secure memory.

The interim routine of FIG. 5 incorporates a common recurring critical routine of the overall larger data processing routine. In this embodiment the critical routine is the movement of source data to a destination. The source data is data that is dynamically processed during the overall larger data processing routine. The interim routine of FIG. 5 is executed between each occurrence of the externally observable event and the execution of the predetermined protected routine.

The interim routine of FIG. 5 includes the following subroutines, START, INITIALIZATION, iTH BIT OF X=1?, SET iTH BIT OF Y TO 1, INCREMENT i, i>WORD SIZE OF SOURCE DATA?, DESTINATION DATA=Y $\oplus$ SOURCE DATA, WRITE NEW SECURE DATA, AND EXIT (identified respectively by reference numerals 72, 73, 74, 75, 76, 77, 78, 79, 80). The interim routine of FIG. 5 also includes TAMPER DETECT subroutines (not shown), such as the TAMPER DETECT subroutine 26 described above, both preceding and following both the INITIALIZATION subroutine 73 and the WRITE NEW SECURE DATA SUBROUTINE 79. The instructions for the interim routine of FIG. 5 are stored in a ROM and executed by a CPU in the same manner as shown in FIG. 1.

After the START subroutine 72, the CPU executes the INITIALIZATION subroutine 73, during which a register X is loaded with the result of the dynamic SOURCE DATA being XORed with SECURE DATA accessed from a secure RAM, a register Y is set to zero, and a counter i is set to zero. The address of the destination of the source data is also stored during the INITIALIZATION subroutine 73.

The CPU next executes the iTH BIT OF X=1? subroutine 74, in which it is determined whether the ith bit position of the X register is a ONE bit. Each time this subroutine 74 is executed, this determination is made with respect to a different bit position i of the X register, beginning with the least significant bit position.

Whenever the ith bit position of the Y register is a ONE bit, the SET iTH BIT OF X TO 1 subroutine 75 is executed to set the ith bit position of the Y register to ONE. The INCREMENT i subroutine 76 is then executed to increment the i register by one count.

Whenever the ith bit position of the Y register is a ZERO bit, the INCREMENT i subroutine 76 is executed to increment the i register by one count.

The i>WORD SIZE OF SOURCE DATA? subroutine determines whether the iTH BIT OF X=1? subroutine 74 has been executed for all i bit positions of the X register. If not, the subroutine 74 is repeated.

When the iTH BIT OF X=1? subroutine 74 has been executed for all i bit positions of the X register, the CPU executes the DESTINATION DATA=Y $\oplus$ SECURE DATA subroutine 78, in which the contents of the Y register is XORed with the secure data accessed from the RAM to provide the destination data which is moved to the destination indicated in the instruction for the interim routine of FIG. 5.

Tampering by an attacker with the interim routine of FIG. 5 in an attempt to make the total duration of the interim routine a known value would necessarily alter the content of the destination data and thereby prevent the overall larger data processing from being executed properly. If the source data is not moved to its destination correctly, then the rest of the overall larger data processing routine will be executed using incorrect data and will not produce correct results.

The total duration of the interim routine of FIG. 5 is dependent upon the number of ONE bits loaded into the X register during the INITIALIZATION subroutine 73, since the SET iTH BIT OF X TO 1 subroutine 75 is executed only when the ith bit of the X register equals ONE. Thus the range of variation in the duration of the interim routine of FIG. 5 is the number of clock cycles required for the subroutine 75 times the number of bit positions in the X register. Since the number of times that the subroutine 75 is executed is dependent upon the content of the dynamically processed source data and the secure data in the RAM, the total duration of the interim routine of FIG. 5 is a random variable that is unknown to the observer.

The randomness of the the total duration of the interim routine of FIG. 5 is further compounded by execution of the WRITE NEW SECURE DATA subroutine 79, which changes the secure data in the RAM that is accessed during the INITIALIZATION subroutine 73, so that each time the interim routine of FIG. 5 is executed, such secure data may be different. The secure data may be provided in the RAM in response to a signal produced by a physically (truly) random phenomena, such as a noisy diode, or in response to a pseudorandom device, such as a pseudorandom number generator.

The interim routine of FIG. 5 need not be executed in combination with other interim routines and may be incorporated into an overall larger data processing routine any time critical data needs to be moved from one location (source) to another location (destination).

The method and system of the present invention are also applicable for preventing the time of execution of a predetermined data processing routine that is not included in a repetitive overall larger data processing routine from being determined in relation to the occurrence of an externally observable event that precedes the execution of said predetermined routine.

The method and system of the present invention are particularly suited for implementation in a microprocessor that controls descrambling of scrambled information signals by a descrambler in the possession of a subscriber in a subscriber communication network.

What is claimed is:

1. A method of preventing the time of execution of a predetermined data processing routine included in an overall larger data processing routine executed by a data processing system from being determined in relation to an occurrence of an externally observable event that precedes the execution of said predetermined routine, wherein said externally observable event is related to or affected by execution of the overall larger routine, comprising the steps of
    (a) providing a random-content signal during each overall larger data processing routine; and
    (b) varying the duration between an occurrence of the externally observable event and the execution of the predetermined routine during each overall larger data processing routine in response to said random-content signal.

2. A method of preventing the time of execution of a predetermined data processing routine included in an overall larger data processing routine executed by a data processing system from being determined in relation to an occurrence of an externally observable event that precedes the execution of said predetermined routne, wherein said externally observable event is related to or affected by execution of the overall larger routine, comprising the steps of
    (a) executing one or more interim data processing routines between an occurrence of the externally observable event and the execution of the predetermined routine; and
    (b) randomly varying the duration of said interim routines to thereby randomly vary the duration between the occurrence of the externally observable event and the execution of the predetermined routine.

3. A method according to claim 2, wherein steps (a) and (b) comprise the step of
    (c) randomly assembling m said interim routines for said execution from a group of n stored routines having different durations, wherein m and n are integers, with n being greater than m.

4. A method according to claim 3, wherein step (c) comprises the step of
    (d) randomly accessing said m interim routines from a secure memory.

5. A method according to claim 3, wherein step (c) comprises the steps of
    (d) randomly accessing pointers for said m interim routines from a secure memory; and
    (e) accessing said m interim routines from a memory in response to said pointers.

6. A method according to claim 2, wherein step (b) comprises the step of
    (c) providing and executing an instruction during each interim routine that affects the duration of delay for the respective interim routine during a different clock cycle of the different interim routines.

7. A method according to claim 6, further comprising the steps of
    (d) monitoring subroutines of said interim routines preceding and following a subroutine of said interim routine in which the duration-of-delay instruction is provided, to detect whether an attempt has been made to alter said interim routines; and
    (e) preventing the execution of said predetermined routine in response to detecting a said attempt to alter said interim routines.

8. A method according to claim 2, further comprising the steps of
    (c) monitoring said interim routines to detect whether said interim routines are being tampered with; and
    (d) preventing the execution of said predetermined routine in response to detecting that said interim routines are being tampered with.

9. A method according to claim 8, wherein step (d) comprises the steps of
    (e) counting occurrences of tampering of said interim routines being detected; and
    (f) preventing the execution of said predetermined routine in response to said count exceeding a predetermined threshold.

10. A method according to claim 9, wherein step (d) further comprises the step of
    (g) decrementing said count in response to said interim routines being executed without tampering with said interim routines being detected.

11. A method according to claim 8, wherein steps (a) and (c) are executed in response to instructions having the same duration.

12. A method according to claim 2, further comprising the steps of
    (c) monitoring said predetermined data processing routine following the execution of said predetermined routine to detect whether an attacker attempts to access the predetermined routine by the technique of attempting such access at a time beginning after occurrence of the externally observable event of sufficient duration to encompass the maximum possible total duration of all of the interim routines and the duration of the predetermined routine, and then upon each successive cycle of the predetermined data processing routine making such attempt one clock cycle earlier until the predetermined routine ROUTINE N is accessed; and (d) preventing the execution of said predetermined routine in response to detecting said attempt.

13. A method of preventing the time of execution of a predetermined data processing routine included in an overall larger data processing routine executed by a data processing system from being determined in relation to an occurrence of an externally observable event that precedes the execution of said predetermined routine, wherein said externally observable event is related to or affected by execution of the overall larger routine, comprising the steps of (a) executing one or more interim data processing routines between an occurrence of the externally observable event and the execution of the predetermined routine, wherein said interim routines includes a data processing routine that is critical to the execution of said overall larger data processing routine; and (b) randomly varying the duration of said interim routines to thereby randomly vary the duration between the occurrence of the externally observable event and the execution of the predetermined routine.

14. A method of preventing the time of execution of a predetermined data processing routine included in an overall larger data processing routine executed by a data processing system from being determined in relation to an occurrence of an externally observable event that precedes the execution of said predetermined routine, wherein said externally observable event is related to or affected by execution of the overall larger routine, comprising the steps of (a) providing data that is dynamically processed during the overall larger routine and that does not repetitively recur at the same time in relation to each occurrence of said externally observable event; and (b) varying the duration between an occurrence of the externally observable event and the execution of the predetermined routine during each overall larger data processing routine in response to said dynamically processed data.

15. A method according to claim 14, wherein step (b) comprises the step of (c) executing a critical subroutine of said predetermined data processing routine using said dynamically processed data, wherein the duration of said critical subroutine is dependent upon the content of said dynamically processed data.

16. A method according to claim 15, wherein said critical subroutine comprises the step of (d) moving said dynamically processed data from a source to a destination.

17. A method of preventing the time of execution of a predetermined data processing routine included in an overall larger data processing routine executed by a data processing system from being determined in relation to an occurrence of an externally observable event that precedes the execution of said predetermined routine, wherein said externally observable event is related to or affected by execution of the overall larger routine, comprising the steps of (a) providing data that is dynamically processed during the overall larger routine and that does not repetitively recur at the same time in relation to each occurrence of said externally observable event; and (b) the duration between an occurrence of the externally observable event and the execution of the predetermined routine during each overall larger data processing routine in response to a combination of said dynamically processed data and data stored in a secure memory.

18. A data processing system, comprising means for executing a macro data processing routine including a smaller predetermined data processing routine, wherein an externally observable event related to or affected by execution of the macro routine precedes execution of said predetermined routine;

means for providing a random-content signal during each macro routine; and means for varying the duration between the occurrence of the externally observable event and the execution of the predetermined routine in response to said random-content signal to thereby prevent the time of execution of the predetermined data processing routine from being determined in relation to the occurrence of the externally observable event.

19. A system comprising means for executing a macro data processing routine including a smaller predetermined data processing routine, wherein an externally observable event related to or affected by execution of the macro routine precedes execution of said predetermined routine;

means for executing one or more interim data processing routines between the occurrence of the externally observable event and the execution of the predetermined routine; and means for randomly varying the duration of said interim routines to thereby vary the duration between the occurrence of the externally observable event and the execution of the predetermined routine in order to prevent the time of execution of the predetermined data processing routine from being determined in relation to the occurrence of the externally observable event.

20. A system according to claim 19, wherein the duration varying means comprises means for randomly assembling m said interim routines for said execution from a group of n stored routines having different durations, wherein m and n are integers, with n being greater than m.

21. A system according to claim 20, wherein the assembling means comprises means for randomly accessing said m interim routines from a secure memory.

22. A system according to claim 20, wherein the assembling means comprises means for randomly accessing pointers for said m interim routines from a secure memory; and means for accessing said m interim routines from a memory in response to said pointers.

23. A system according to claim 19, wherein the duration varying means comprises means for providing and executing an instruction during each interim routine that affects the duration of delay for the respective interim routine during a different clock cycle of the different interim routines.

24. A system according to claim 23, further comprising means for monitoring subroutines of said interim routines preceding and following a subroutine of said interim routine in which the duration-of-delay instruction is provided, to detect whether an attempt has been made to alter said interim routines; and means for preventing the execution of said predetermined routine in response to detecting a said attempt to alter said interim routines.

25. A system according to claim 19, further comprising means for monitoring said interim routines to detect whether said interim routines are being tampered with; and means for preventing the execution of said predetermined routine in response to detecting that said interim routines are being tampered with.

26. A system according to claim 25, wherein the preventing means comprises means for counting occurrences of tampering of said interim routines being detected; and means for preventing the execution of said predetermined routine in response to said count exceeding a predetermined threshold.

27. A system according to claim 26, wherein the preventing means further comprises means for decrementing said count in response to said interim routines being executed without tampering with said interim routines being detected.

28. A system according to claim 25, wherein the executing means and the monitoring means respond to instructions having the same duration.

29. A system according to claim 19, further comprising means for monitoring said predetermined data processing routine following the execution of said predetermined routine to detect whether an attacker attempts to access the predetermined routine by the technique of attempting such access at a time beginning after occurrence of the externally observable event of sufficient duration to encompass the maximum possible total duration of all of the interim routines and the duration of the predetermined routine, and then upon each successive cycle of the predetermined data processing routine making such attempt one clock cycle earlier until the predetermined routine ROUTINE N is accessed; and means for preventing the execution of said predetermined routine in response to detecting said attempt.

30. A system comprising means for executing a macro data processing routine including a smaller predetermined data processing routine, wherein an externally observable event related to or affected by execution of the macro routine precedes execution of said predetermined routine;

means for executing one or more interim data processing routines between the occurrence of the externally observable event and the execution of the predetermined routine, wherein said interim routines include a data processing routine that is critical to the execution of said macro routine; and means for randomly varying the duration of said interim routines to thereby vary the duration between the occurrence of the externally observable event and the execution of the predetermined routine in order to prevent the time of execution of the predetermined data processing routine from being determined in relation to the occurrence of the externally observable event.

31. A system comprising means for executing a macro data processing routine including a smaller predetermined data processing routine, wherein an externally observable event related to or affected by execution of the macro routine precedes execution of said predetermined routine;

means for providing data that is dynamically processed during the macro routine and that does not repetitively recur at the same time in relation to each occurrence of said externally observable event; and means for varying the duration between an occurrence of the externally observable event and the execution of the predetermined routine during each macro routine in response to said dynamically processed data to thereby prevent the time of execution of the predetermined data processing routine from being determined in relation to the occurrence of the externally observable event.

32. A system according to claim 31, wherein the duration varying means comprises means for executing a critical subroutine of said predetermined data processing routine using said dynamically processed data, wherein the duration of said critical subroutine is dependent upon the content of said dynamically processed data.

33. A system according to claim 32, wherein the critical subroutine executing means comprises means for moving said dynamically processed data from a source to a destination.

34. A system comprising means for executing a macro data processing routine including a smaller predetermined data processing routine, wherein an externally observable event related to or affected by execution of the macro routine precedes execution of said predetermined routine;

means for providing data that is dynamically processed during the macro routine and that does not repetitively recur at the same time in relation to each occurrence of said externally observable event; and means for varying the duration between an occurrence of the externally observable event and the execution of the predetermined routine during each macro routine in response to a combination of said dynamically processed data and data stored in a secure memory to thereby prevent the time of execution of the predetermined data processing routine from being determined in relation to the occurrence of the externally observable event.

* * * * *

UNITED STATES PATENT AND TRADEMARK OFFICE
CERTIFICATE OF CORRECTION

PATENT NO. : 5,249,294

DATED : September 28, 1993

INVENTOR(S) : Griffin, III et al.

It is certified that error appears in the above-identified patent and that said Letters Patent is hereby corrected as shown below:

In the ABSTRACT, at line 5, after "execution", insert --of the--.

Column 12, line 6, before "the" (first occurrence), insert --varying--.

Signed and Sealed this

Twenty-second Day of March, 1994

Attest:

BRUCE LEHMAN

Attesting Officer     Commissioner of Patents and Trademarks